(12) United States Patent
La Rosa et al.

(10) Patent No.: US 8,980,983 B2
(45) Date of Patent: Mar. 17, 2015

(54) HIGHLY FLEXIBLE, HALOGEN-FREE AND FIRE-RESISTANT THERMOPLASTIC CABLE MIXTURES

(75) Inventors: Manuel La Rosa, Köln (DE); Martin Hoch, Shanghai (CN); Albertus Tankink, Belfeld (NL)

(73) Assignee: LANXESS Deutschland GmbH, Cologne (DE)

( * ) Notice: Subject to any disclaimer, the term of this patent is extended or adjusted under 35 U.S.C. 154(b) by 794 days.

(21) Appl. No.: 13/059,473

(22) PCT Filed: Aug. 14, 2009

(86) PCT No.: PCT/EP2009/060535
§ 371 (c)(1),
(2), (4) Date: Sep. 30, 2011

(87) PCT Pub. No.: WO2010/020586
PCT Pub. Date: Feb. 25, 2010

(65) Prior Publication Data
US 2012/0010346 A1    Jan. 12, 2012

(30) Foreign Application Priority Data
Aug. 21, 2008 (EP) .................... 08162772

(51) Int. Cl.
*C08L 31/04* (2006.01)
*C08K 3/22* (2006.01)

(52) U.S. Cl.
USPC ............ 524/424; 524/524; 524/436; 524/437

(58) Field of Classification Search
USPC .................. 524/424, 524, 436, 437
See application file for complete search history.

(56) References Cited

U.S. PATENT DOCUMENTS

| | | | |
|---|---|---|---|
| 4,937,303 A | 6/1990 | Wolf et al. | |
| 5,017,637 A | 5/1991 | Smith et al. | |
| 5,135,988 A | 8/1992 | Meurer et al. | |
| 5,218,027 A | 6/1993 | Smith et al. | |
| 5,703,187 A | 12/1997 | Timmers | |
| 5,872,201 A | 2/1999 | Cheung et al. | |
| 6,667,358 B1 | 12/2003 | Aoyama | |
| 2005/0131129 A1 | 6/2005 | Uehara et al. | |
| 2005/0137306 A1 | 6/2005 | Hausmann et al. | |
| 2007/0010615 A1 | 1/2007 | Cogen et al. | |

FOREIGN PATENT DOCUMENTS

| | | |
|---|---|---|
| EP | 0307755 A2 | 4/1989 |
| EP | 0416815 B1 | 8/1990 |
| EP | 0510478 A1 | 10/1992 |
| JP | 2001-316537 A * | 11/2001 |
| WO | 2006068309 A1 | 6/2006 |

OTHER PUBLICATIONS

International Search Report from co-pending Application PCT/EP2009/060535 dated August 14, 2009, 4 pages.
K. Naskar et al. "Development of Thin-Walled Halogen-Free Cable Insulation and Halogen-Free Fire-Resistant Low-Smoke Cable-Sheathing Compounds Based on Polyolefin Elastomer and Ethylene Vinyl Acetate Blends" Journal of Applied Polymer Science vol. 104 2839-2848 (2007).
A.A. Basfar et al. "Mechanical and Thermal Properties of Blends of Low-Density Polyethylene and Ethylene Vinyl Acetate Crosslinked by Both Dicumyl Peroxide and Ionizing Radiation for Wire and Cable Applications" Journal of Applied Polymer Science vol. 107,642-649 (2008).

* cited by examiner

*Primary Examiner* — Robert D. Harlan
(74) *Attorney, Agent, or Firm* — Jennifer R. Seng

(57) ABSTRACT

Compositions comprising at least one thermoplastic polymer as component A, at least one $C_2$-$C_4$-α-olefin-vinyl acetate copolymer having vinyl acetate content of >40% by weight as component B, at least one plastomer produced via metallocene catalysis and based on ethylene and on at least one $C_4$-$C_8$-olefin as component C, where component C differs from component A, at least one polyolefin homo- or copolymer modified with an unsaturated carboxylic acid or with a derivative thereof, as component D, at least one flame retardant as component E, and also optionally one or more further auxiliaries and additives, a process for producing the compositions of the invention, the use of the compositions of the invention as insulation materials or, respectively, sheathing materials for cables or lines, insulation materials or, respectively, sheathing materials for cables or lines, comprising the composition of the invention, and also cables or lines which comprise the composition of the invention.

7 Claims, 18 Drawing Sheets

HIGHLY FLEXIBLE, HALOGEN-FREE AND FIRE-RESISTANT THERMOPLASTIC CABLE MIXTURES

This application is a 371 of international application No. PCT/EP2009/060535 filed Aug. 14, 2009, claiming priority to European application No. 08162772.1, filed Aug. 21, 2008, entitled "Highly flexible, halogen-free and flame-retardant thermoplastic cable mixtures", the contents of which are hereby incorporated by reference in their entirety.

The present invention relates to compositions comprising at least one thermoplastic polymer as component A, at least one $C_2$-$C_4$-α-olefin-vinyl acetate copolymer having vinyl acetate content of >40% by weight as component B, at least one plastomer produced via metallocene catalysis and based on ethylene and on at least one $C_4$-$C_8$-olefin as component C, where component C differs from component A, at least one polyolefin homo- or copolymer, modified with an unsaturated carboxylic acid or with a derivative thereof, as component D, at least one flame retardant as component E, and also optionally one or more further auxiliaries and additives, a process for producing the compositions of the invention, the use of the compositions of the invention as insulation materials or, respectively, sheathing materials for cables or lines, insulation materials or, respectively, sheathing materials for cables or lines, comprising the composition of the invention, and also cables or lines which comprise the composition of the invention.

Cables and lines are used in a wide variety of applications, e.g. in the telecommunications sector, in the automobile industry sector, in other industries and in households, in marine transport, for railroads, in the military sector, and in the offshore exploration sector. The service properties demanded from the cables and lines are essential to the selection of the materials for insulation and other protective coverings, such as sheathing. Particularly essential criteria are those such as adequate operating safety and operating lifetime, environmental compatibility, and costs for the selection of suitable insulation materials and, respectively, sheathing materials.

In relation to operating safety, one of the other essential factors alongside the correct choice of the conductor is the electrical properties of the insulation.

From the point of view of operating lifetime (lifetime in service), examples of factors relevant to the selection of the insulation materials and, respectively, sheathing materials are the usage temperatures and other usage conditions, such as mechanical load due to bending (including bending at low temperatures), thermal expansion behavior (determined by means of the hotset test), chemical effects due to organic hydrocarbons, for example fats and oils (e.g. in the wiring of various automobile parts or the provision of electrical equipment to automobiles), and UV radiation, and also resistance to aging.

In relation to environmental compatibility, requirements are placed especially on recyclability, freedom from halogen, and behavior in the event of fire.

Factors that have to be considered in the cost-conscious selection of suitable materials are not only the purchase costs and the specific materials usage but also the processing costs and the capital expenditure costs.

Polyvinyl chloride (PVC) is the most important insulation material and, respectively, sheathing material in the cable industry. The PVC can be modified for a wide range of applications by using plasticizers, stabilizers, fillers, and lubricants. However, PVC not only has a high dielectric loss factor but also performs disadvantageously in the event of a fire. Although PVC has low flammability, the high level of smoke generated in the event of a fire is problematic, as also are the corrosive gases produced via elimination of chlorine.

Halogen-free thermoplastic materials, such as polyethylene, ethylene-vinyl acetate copolymers (EVA), and also the corresponding crosslinked polymers, have therefore achieved substantial importance as insulation materials and, respectively, sheathing materials alongside PVC in the cable industry. However, the halogen-free thermoplastic materials such as polyethylene (PE) or ethylene-vinyl acetate copolymers (EVA) do not themselves generally have good flame retardancy. It is therefore necessary to equip said halogen-free thermoplastic materials with flame retardants when they are used as insulation materials or, respectively, sheathing materials for cables or lines. Flame retardants usually used are halogen-free flame retardants, such as aluminum hydroxide (ATH (also termed aluminum oxide trihydrate)) or magnesium hydroxide (MDH). So that these halogen-free flame retardants are effective, large amounts of the same are generally added to the thermoplastic materials. Said flame retardants have no, or poor, compatibility with the halogen-free, in essence nonpolar, thermoplastic materials usually used, and compositions based on the thermoplastic materials such as polyethylene (PE) and/or ethylene-vinyl acetate copolymers (EVA) and equipped with said flame retardants usually have low strength and flexibility, poor processing properties, e.g. poor miscibility and extrudability, and also unsatisfactory flame retardancy.

Figure 1:
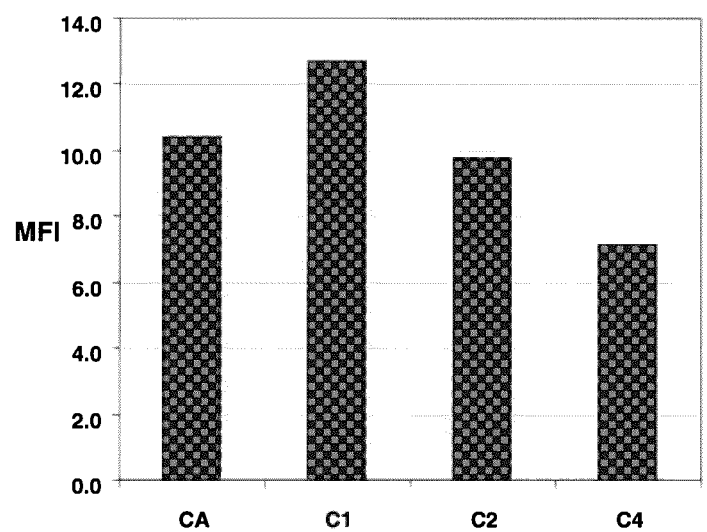
FIGS. 1-18 illustrate the results of the various tests as set forth in the Examples.

The prior art has disclosed numerous attempts to avoid the abovementioned disadvantages by using large amounts of halogen-free flame retardants, such as aluminum hydroxide or magnesium hydroxide.

By way of example, WO 2006/068309 relates to a flame-retardant resin composition which requires no crosslinking treatment for use in molded items, in particular as coating material for wire materials. Said composition encompasses a resin constituent (A) which from 0 to 90% by weight of a copolymer of ethylene and vinyl acetate (a-1) and/or of a copolymer of ethylene and (meth)acrylate (a-2); from 3 to 45% by weight of a polyolefin (b-1) modified with an unsaturated carboxylic acid or with a derivative of the same and/or of a copolymer (b-2) of ethylene and (meth)acrylic acid, from 5 to 50% by weight of acrylic rubber which comprises (meth)acrylic acid as a copolymer constituent (c), and from 0 to 45% of a polypropylene (d). The composition moreover comprises from 100 to 300 parts by weight of magnesium hydroxide, based on 100 parts by weight of the resin constituent (A). The flame-retardant composition is intended to have excellent flame retardancy, excellent mechanical properties, excellent flexibility, excellent abrasion resistance, and excellent heat resistance. According to WO 2006/068309, in order to achieve the advantageous properties it is essential that the essential constituents of the compositions of WO 2006/068309, namely the constituent (b-1) and/or (b-2) or the constituent (c), are within the claimed comparative ranges.

EP-A 0 333 514 discloses flame-retardant compositions which encompass: a) from 5 to 60% by weight of an olefin copolymer or, respectively, olefin terpolymer with low modulus, in which from 3 to 20% by weight of the copolymer or terpolymer are composed of a carboxylic acid comonomer; b) from 1 to 15% by weight of an organopolysiloxane; and c)

from 20 to 85% by weight of a flame-retardant additive which encompasses a metal oxide hydrate of a metal of group I, II, or III of the PTE. According to EP-A 0 333 514, the use of polymers and elastomers with low modulus gives compositions with tensile and flexural strength improved over the prior art, making the finished product suitable for vacuum forming. K. Naskar et al., Journal of Applied Polymer Science, vol. 104, 2839-2848 (2007) relates to the development of thin-walled halogen-free cable insulation and of halogen-free flame-retardant cable sheathing which has a low level of smoke generation and is based on polyolefin elastomers and ethylene-vinyl acetate mixtures. The mixtures used in Naskar et al. comprise for example (mixture SH-11) a polyolefin elastomer, where this involves a copolymer of ethylene and n-octene, an ethylene-vinyl acetate copolymer having vinyl acetate content of 28% by weight, an ethylene-vinyl acetate copolymer having vinyl acetate content of 45% by weight, and also aluminum trihydroxide (ATH) as flame retardant, and also a combination of dicumyl peroxide and trialyl cyanurate as crosslinking agent, and vinyl silane as functionalizing reagent.

A. A. Basfar et al., Journal of Applied Polymer Science, vol. 107, 642-649 (2008) relates to mechanical and thermal properties of mixtures made of LDPE and ethylene-vinyl acetate, where these are crosslinked both by dicumyl peroxide and also by ionic irradiation, for use as insulation material for cables and wires.

The compositions involve crosslinked compositions which comprise, alongside LDPE and ethylene-vinyl acetate copolymers, coadditives, inter alia maleic-anhydride-grafted polyethylene and vinyl silane, and which moreover comprise ammonium polyphosphates as flame retardant.

From the abovementioned prior art it is apparent that production of compositions suitable as insulation materials or, respectively, sheathing materials for cables or lines requires that all of the additives, in particular the large amounts of polar flame retardant used, are compatible with the polymers used, in order to obtain compositions with a balanced property profile. The property profile of the compositions mentioned in the prior art is moreover unsatisfactory, in particular in respect of mechanical properties at high filler contents, examples being tensile strength and elongation at break, both at room temperature and at low temperatures below room temperature, and also after aging, and hardness (Shore A and Shore D), and with respect to viscosity, and also with respect to flame retardancy. It is moreover essential—in particular for use as insulation materials and, respectively, sheathing materials for cables used in the automobile sector, and also in shipbuilding, and in offshore exploration—that the compositions provided have not only high flexibility but also very good resistance to organic hydrocarbons, in particular to oil.

It is therefore the object of the present invention to provide compositions which, without crosslinking, can be used as insulation materials and, respectively, sheathing materials for cables or lines, and which have high flexibility, good flame retardancy, and excellent resistance to organic hydrocarbons, and also good processability.

Said object is achieved via compositions comprising a) at least one thermoplastic polymer as component A, preferably at least one polyolefin homo- or copolymer, particularly preferably selected from homopolymers, based on $C_2$-$C_4$-α-olefins and on copolymers, based on $C_2$-$C_4$-α-olefins and on other $C_2$-$C_4$-α-olefins different from the former $C_2$-$C_4$-α-olefins, on $C_1$-$C_4$-alkyl acrylates, or on $C_1$-$C_4$-alkyl methacrylates, or acrylic acid, methacrylic acid, or vinyl acetate, where the vinyl acetate content in the copolymers is ≤40% by weight, or on a mixture thereof, particular preference being given to $C_2$-$C_4$-α-olefin-vinyl acetate copolymers having vinyl acetate content of ≤40% by weight or a mixture comprising polyethylene, preferably LLDPE, and a $C_2$-$C_4$-α-olefin-vinyl acetate copolymer having vinyl acetate content of ≤40% by weight, where the $C_2$-$C_4$-α-olefin-vinyl acetate copolymer used having vinyl acetate content of ≤40% by weight preferably involves ethylene-vinyl acetate copolymer having vinyl acetate content of ≤40% by weight;

b) at least one $C_2$-$C_4$-α-olefin-vinyl acetate copolymer having vinyl acetate content of >40% by weight, preferably from 45 to 98% by weight, particularly preferably either (i) having vinyl acetate content of from 40 to 60% by weight, preferably from 40 to 50% by weight, or (ii) having vinyl acetate content of from 50 to 90% by weight, particularly from 70 to 85% by weight, as component B, where the $C_2$-$C_4$-α-olefin-vinyl acetate copolymer preferably involves ethylene-vinyl acetate copolymer;

c) at least one plastomer produced via metallocene catalysis and based on ethylene and on at least one $C_4$-$C_8$-olefin as component C, where component C differs from component A, particularly preferably based on ethylene and octene, ethylene and hexene, or ethylene and butene, very particularly preferably based on ethylene and 1-octene;

d) at least one polyolefin homo- or copolymer modified with an unsaturated carboxylic acid or with a derivative thereof, preferably selected from polyethylene grafted with carboxylated compounds and $C_2$-$C_4$-α-olefin-vinyl acetate copolymers grafted with carboxylated compounds, particularly preferably involving ethylene-vinyl acetate copolymers, particularly preferably maleic-anhydride-grafted LLDPE (MA_g_LLDPE) or maleic-anhydride-grafted $C_2$-$C_4$-α-olefin-vinyl acetate copolymer, preferably having vinyl acetate content of >40% by weight, particularly preferably from 45 to 98% by weight, particularly preferably from 45 to 80% by weight, where the $C_2$-$C_4$-α-olefin-vinyl acetate copolymer preferably involves ethylene-vinyl acetate copolymer (MA_g_EVM), as component E;

e) at least one flame retardant as component E, preferably at least one inorganic flame retardant, particularly preferably aluminum hydroxide (ATH), magnesium hydroxide (MDH), magnesium carbonate and/or sodium aluminum hydroxycarbonate, and hydrotalcite, very particularly preferably aluminum hydroxide (ATH) and/or magnesium hydroxide (MDH); and f) optionally one or more further auxiliaries and/or further additives as component F.

The compositions of the invention feature a balanced property profile in particular in the presence of large amounts of flame retardant, i.e. they have good flexibility, which is apparent from good values for tensile strength and elongation at break both at room temperature and also at low temperatures, good flame-retardancy properties, e.g. low smoke density, low heat release rate, low mass loss rate, low $CO/CO_2$ ratio, high limiting oxygen indices (LOI), good processing properties, e.g. high melt flow index (MFI), and low hardness, good resistance to organic hydrocarbons, in particular good oil resistance, and also good aging properties, e.g. little change in properties after hot-air aging. The specific combination of components A, B, C, and D with the flame retardant E is essential here, and component B here acts as compatibilizer between the thermoplastic polymer A and the flame retardant E in collaboration with components C and D. The use of component B in the compositions of the invention together with components A, C and E and optionally F, can improve the following properties of the compositions: flexibility, compatibility of the components used, flame-retardancy properties, and also resistance to organic hydrocarbons.

In the present application, $C_2$-$C_4$-α-olefins are all of the $C_2$-$C_4$-α-olefins known to the person skilled in the art. The $C_2$-$C_4$-α-olefins are preferably those selected from the group consisting of ethylene, propylene, butylene, in particular n-butylene and isobutylene. Preferred $C_2$-$C_4$-α-olefins are ethylene and propylene, and very particular preference is given here to ethylene as $C_2$-$C_4$-α-olefin.

For the purposes of the present invention, the term "halogen-free" means that the amounts of halogen present both in the composition of the invention and in the individual components of the composition of the invention do not exceed amounts corresponding to impurities. The halogen content of the compositions of the invention and, respectively, the halogen content of components A to E and optionally F is therefore generally from 0 to 5% by weight, preferably from 0 to 3% by weight, in particular preferably from 0 to 1% by weight, based on the total weight of the composition and, respectively, based on the respective component.

Component A: At Least One Thermoplastic Polymer

A thermoplastic halogen-free polymer is used as component A. This preferably involves a polyolefin homo- or copolymer. Suitable polyolefin homo- or copolymers are particularly preferably those selected from homopolymers, based on $C_2$-$C_4$-α-olefins and on copolymers, based on $C_2$-$C_4$-α-olefins and on other $C_2$-$C_4$-α-olefins different from the former $C_2$-$C_4$-α-olefins, on $C_1$-$C_4$-alkyl acrylates, or on $C_1$-$C_4$-alkyl methacrylates, or acrylic acid, methacrylic acid, or vinyl acetate, where the vinyl acetate content in the copolymers is ≤40% by weight, or on a mixture thereof. The expression "mixture thereof" means that among the copolymers based on $C_2$-$C_4$-α-olefines and the abovementioned comonomers there are also copolymers which can have one, two or more other different monomer components alongside the monomer components used as $C_2$-$C_4$-α-olefins.

Particularly preferred components A are polyethylene (PE), e.g. low-density polyethylene (LDPE), linear low-density polyethylene (LLDPE), very low-density polyethylene (VLDPE), medium-density polyethylene (MDPE), and high-density polyethylene (HDPE), polypropylene (PP), $C_2$-$C_4$-α-olefin-vinyl acetate copolymer having vinyl acetate content of ≤40% by weight, e.g. ethylene-vinyl acetate copolymer having vinyl acetate content of ≤40% by weight (EVA), ethylene-ethyl acrylate copolymer (EEA), ethylene-butyl acrylate copolymer (EDA), ethylene-propylene rubber (EPR), ethylene-(meth)acrylate copolymers, and mixtures of the polymers mentioned. The following are particularly preferably used as component A: $C_2$-$C_4$-α-olefin-vinyl acetate copolymers having vinyl acetate content of ≤40% by weight, e.g. ethylene-vinyl acetate copolymers having vinyl acetate content of ≤40% by weight, and mixtures comprising polyethylene, e.g. LLDPE, and $C_2$-$C_4$-α-olefin-vinyl acetate copolymers having vinyl acetate content of ≤40% by weight, e.g. ethylene-vinyl acetate copolymers having vinyl acetate content of ≤40% by weight. When mixtures comprising polyethylene and $C_2$-$C_4$-α-olefin-vinyl acetate copolymers are used, the content of polyethylene is generally from 10 to 90% by weight, preferably from 20 to 80% by weight, and the content of $C_2$-$C_4$-α-olefin-vinyl acetate copolymers having vinyl acetate content of ≤40% by weight is generally from 10 to 90% by weight, preferably from 20 to 80% by weight, where the entirety of polyethylene and $C_2$-$C_4$-α-olefin-vinyl acetate copolymers is 100% by weight.

The thermoplastic polymers used as component A are known to the person skilled in the art and can be produced by any desired processes known to the person skilled in the art, or are commercially available.

In one very particularly preferred embodiment, component A has been selected from ethylene-vinyl acetate copolymers having vinyl acetate content of ≤40% by weight, preferably from 15 to ≤40% by weight, particularly preferably from 20 to 35% by weight, very particularly preferably from 20 to 30% by weight, and a mixture comprising LLDPE and ethylene-vinyl acetate copolymer having vinyl acetate content of ≤40% by weight, preferably from 15 to ≤40% by weight, particularly preferably from 20 to 35% by weight, very particularly preferably from 20 to 30% by weight, where the entirely of ethylene and vinyl acetate in the ethylene-vinyl acetate copolymer is 100% by weight.

Component B

Component B involves at least one $C_2$-$C_4$-α-olefin-vinyl acetate copolymer having vinyl acetate content of >40% by weight. Component B is essential in the compositions of the invention, since it acts as compatibilizer between component A, which is in essence nonpolar, and the flame retardant (component E), which is usually polar. The $C_2$-$C_4$-α-olefin-vinyl acetate copolymers used as component B preferably have vinyl acetate content of from 45 to 98% by weight, particularly preferably either (i) from 40 to 60% by weight, preferably from 40 to 50% by weight, or (ii) from 50 to 90% by weight, particularly from 70 to 85% by weight. This vinyl acetate content data in the present application is always based on the total amount of ethylene units and vinyl acetate units in the ethylene-vinyl acetate copolymer, which is 100% by weight. This means that the ethylene content in component B is ≤60% by weight, preferably from 2 to 55% by weight, particularly preferably either (i) from 40 to 60% by weight, preferably from 50 to 60% by weight, or (ii) from 10 to 50% by weight, particularly from 15 to 30% by weight.

The $C_2$-$C_4$-α-olefin-vinyl acetate copolymers used as component B can have one or more further comonomer units alongside the monomer units based on the $C_2$-$C_4$-α-olefin and on vinyl acetate (examples being terpolymers), examples being materials based on vinyl esters and/or on (meth)acrylates. The proportions present of the further comonomer units—if indeed further comonomer units are present in component E—are up to 10% by weight, based on the total weight of the $C_2$-$C_4$-α-olefin-vinyl acetate copolymers, where the proportion of the monomer units based on the $C_2$-$C_4$-α-olefin is correspondingly reduced. In one preferred embodiment, $C_2$-$C_4$-olefin-vinyl acetate copolymers used as component B have no further monomer units. The $C_2$-$C_4$-α-olefin-vinyl acetate copolymers very particularly preferably involve ethylene-vinyl acetate copolymers.

The $C_2$-$C_4$-α-olefin-vinyl acetate copolymers used as component B and having vinyl acetate content of >40% by weight can by way of example be produced by a solution polymerization process at a pressure of from 100 to 700 bar, preferably at a pressure of from 100 to 400 bar. The solution polymerization process is preferably carried out at temperatures of from 50 to 150° C., and free-radical initiators are generally used here. Suitable production processes for the abovementioned $C_2$-$C_4$-α-olefin-vinyl acetate copolymers produced via solution polymerization processes are mentioned by way of example in EP-A 0 341 499, EP-A 0 510 478 and DE-A 38 25 450. The $C_2$-$C_4$-α-olefin-vinyl acetate copolymers produced by the abovementioned solution polymerization process in particular feature low degrees of branching and therefore low viscosities. Said $C_2$-$C_4$-α-olefin-vinyl acetate copolymers moreover have a more uniform statistical distribution of their units ($C_2$-$C_4$-α-olefin and vinyl acetate) than $C_2$-$C_4$-α-olefin-vinyl acetate copolymers produced by other processes.

The ethylene-vinyl acetate copolymers used with particular preference as component B and having vinyl acetate content of >40% by weight are usually termed EVM copolymers, where the "M" in this term indicates the saturated main methylene chain of the EVM.

The ethylene-vinyl acetate copolymers preferably used as component B generally have MFI values (g/10 min.), measured to ISO at 133 to 190° C. and with a load of 21.1 N, of from 1 to 40, preferably from 1 to 10, particularly preferably from 2 to 6. The Mooney viscosities of the $C_2$-$C_4$-α-olefin-vinyl acetate copolymers mentioned, ML 1+4 to DIN 53 523, at 100° C., are generally from 3 to 50, preferably from 4 to 35. Mooney units. By way of example, ethylene-vinyl acetate copolymers used as component B can have vinyl acetate content of from 75 to 98% by weight, gel content of <0.5% by weight, and weight-average molecular weight of >150 000, as described by way of example in DE-A 37 31 054.

Examples of ethylene-vinyl acetate copolymers suitable as component B are available commercially with trademarks Levapren® or Levamelt® from Lanxess Deutschland GmbH. These preferably involve ethylene-vinyl acetate copolymers such as Levapren® 450, Levapren® 452, Levapren® 456, Levapren®500, Levapren® 600, Levapren®700, Levapren® 800 and Levapren® 900, or the corresponding Levamelt® products.

Component C

At least one plastomer produced via metallocene catalysis and based on ethylene and on at least one $C_4$-$C_8$-olefin is used as component C, where component C differs from component A. Alongside component B, component C is also an essential component of the compositions of the invention and contributes to improved processability and to a balanced property profile of the compositions of the invention. The plastomers used as component C are random ethylene copolymers. The content of $C_4$-$C_8$-olefin in the random ethylene copolymers is controlled via the specific arrangement of the comonomers in the polymer chain by means of catalysts having unitary active centers based on metallocene catalyst systems (see, for example, EP 0 416 815, U.S. Pat. No. 5,703,187, and U.S. Pat. No. 5,872,201). The content of $C_4$-$C_8$-olefins as comonomers in the ethylene comonomers is generally from 5 to 50% by weight, preferably from 10 to 35% by weight.

Suitable $C_4$-$C_8$-olefins which serve as monomers to produce the ethylene copolymers used as component C are preferably those selected from octene, hexene, and butene, and particular preference is given here to 1-octene. It is therefore very particularly preferable that component C involves a plastomer produced via metallocene catalysis and based on ethylene and 1-octene, where the content of 1-octene units in the copolymer is generally from 5 to 50% by weight, preferably from 10 to 35% by weight, based on the entirety of ethylene units and 1-octene units in the copolymer, which is 100% by weight. Component C can be produced by processes known to the person skilled in the art (see EP 0 416 815, U.S. Pat. No. 5,703,187, and U.S. Pat. No. 5,872,201) or is commercially available, e.g. with trademark Exact®0210 from DSM/Exxon Mobil Chemical Joint Venture.

Component D

Component D involves at least one polyolefin homo- or copolymer modified with unsaturated carboxylic acid or with a derivative thereof. Component D, too, is essential in the compositions of the invention, since this component, too, contributes to the improvement of compatibility between the thermoplastic polymer (component A) which is in essence nonpolar and the flame retardant (component E), which is generally polar.

Suitable polyolefin homo- or copolymers which are modified with an unsaturated carboxylic acid or with a derivative thereof in order to provide component D are the homo- or copolymers mentioned as component A. In addition to the homo- or copolymers mentioned as component A, it is also possible to use $C_2$-$C_4$-α-olefin-vinyl acetate copolymers having content of >40% by weight, as used as component B in the present application.

A polyolefin homo- or copolymer modified with an unsaturated carboxylic acid or with a derivative thereof is in particular the corresponding polyolefin homo- or copolymer onto which the unsaturated carboxylic acid or the derivative thereof has been grafted.

It is particularly preferable that the polyolefin homo- or copolymer involves polyethylene, preferably LLDPE, or involves $C_2$-$C_4$-α-olefin-vinyl acetate copolymer, preferably having vinyl acetate content of >40% by weight, particularly preferably from 45 to 98% by weight, very particularly preferably from 45 to 80% by weight, preferably involving ethylene-vinyl acetate copolymer preferably having vinyl acetate content of >40% by weight, particularly preferably from 45 to 98% by weight, very particularly preferably from 45 to 80% by weight.

Examples of suitable unsaturated carboxylic acids are acrylic acid, methacrylic acid, maleic acid, itaconic acid, fumaric acid, and mixtures thereof. Examples of the derivative of the unsaturated carboxylic acid are esters and anhydrides of the abovementioned acids, and particularly suitable compounds among these are esters of acrylic acid, esters of methacrylic acid, monoesters of maleic acid, diesters of maleic acid, maleic anhydride, monoesters of itaconic acid, diesters of itaconic acid, itaconic anhydride, monoesters of fumaric acid, diesters of fumaric acid, and mixtures thereof. It is particularly preferable to use maleic anhydride.

Component D therefore preferably involves polyethylene grafted with a carboxylated compound, in particular with maleic anhydride, and in particular involves LLDPE (MA_g_LLDPE), or involves $C_2$-$C_4$-α-olefin-vinyl acetate copolymer grafted with carboxylated compounds, in particular with maleic anhydride, and having vinyl acetate content of >40% by weight, preference being given to ethylene-vinyl acetate copolymer having vinyl acetate content of >40% by weight (MA_g_EVM).

Suitable production processes for component D are known to the person skilled in the art. The modification (grafting) of the polyolefin homo- or copolymer can by way of example be carried out via heating and kneading of the polyolefin homo- or copolymer with an unsaturated carboxylic acid or with a derivative thereof in the presence of an organic peroxide. The degree of modification (grafting) with the unsaturated carboxylic acid or with the derivative thereof is generally from 0.5 to 15% by weight, based on the total weight of component D.

By way of example, a maleic-anhydride-grafted LLDPE is suitable as component D and is obtainable by way of example with trademark Fusabond® EMB-226DY from Dupont; another suitable material is maleic-anhydride-modified ethylene-vinyl acetate copolymer having vinyl acetate content of 45±1.5% by weight, available commercially by way of example with trademark Levamelt® MA450VP from Lanxess Deutschland GmbH.

Component E

At least one flame retardant is used as component E in the compositions of the invention. Since the compositions of the present invention are halogen-free, this preferably involves a halogen-free flame retardant. The halogen-free flame retardant is preferably at least one inorganic flame retardant. Suitable inorganic flame retardants are known to the person skilled in the art. Preferred inorganic flame retardants are aluminum hydroxide (also termed aluminum trioxide hydrate (ATH)), magnesium hydroxide (MDH), magnesium carbonate, and/or sodium aluminum hydroxycarbonate, and hydrotalcite.

The following are particularly preferably used as component E in the compositions of the invention: aluminum hydroxide (ATH), magnesium hydroxide (MDH) and/or magnesium carbonate, and very particularly preferably aluminum hydroxide (ATH) and/or magnesium hydroxide (MDH). Suitable flame retardants are known to the person skilled in the art and are usually available commercially. The abovementioned flame retardants aluminum hydroxide and magnesium hydroxide that are used with preference can be used in the untreated form in which they are generally available commercially, or can be subjected to a surface treatment. Examples of a surface treatment encompass a treatment with a fatty acid, a treatment with phosphoric acid, a treatment with titanate, and a treatment with a silane coupling agent, e.g. with a silane which has one of the following: a terminal vinyl group, a methacryloxy group, a glycidyl group, or an amino group. The surface treatment of the aluminum hydroxide or magnesium hydroxide here can by way of example be carried out via mixing of the aluminum hydroxide or magnesium hydroxide with an appropriate treatment composition by processes known to the person skilled in the art. Magnesium hydroxides treated with a silane coupling agent are available commercially by way of example with trade names Kisuma 5L, Kisuma 5N, and Kisuma 5P from Kyowa Chemical Industry Co., Ltd., and Finemag MO-E from TMG Corporation, and Magnefin H5A from Albemarle.

An example of a suitable (untreated) aluminum hydroxide (ATH) is aluminum hydroxide, which is obtainable with trademark Apyral® 40CD from Nabaltec. An example of suitable magnesium carbonate is obtainable with trademark Magfy® from Nuovasima.

The specific surface area (BET surface area) of the filler is generally <30 $m^2/g$, preferably from 1 to 15 $m^2/g$. The specific surface area of aluminum hydroxide (ATH) is particularly preferably from 3 to 8 $m^2/g$, and the specific surface area of magnesium hydroxide (MDH) is particularly preferably from 4 to 8 $m^2/g$.

Component F

The compositions of the invention can optionally comprise one or more further auxiliaries and/or additives as component F. Suitable auxiliaries and additives are in principle known to the person skilled in the art.

Examples of suitable auxiliaries and additives are substances which can further improve the flame retardancy of the compositions of the invention, examples being melamine cyanurate compounds, where these are obtainable by way of example with trade names MCA-0 and MCA-1 from Mitsubishi Chemical, Corp., or with the trade names MC640 and MC610 from Nissan Chemical Industries, Ltd., zinc stannate, zinc hydrostannate or zinc borate, where zinc borate is available by way of example with trade names Alcanex FRC-500 ($2ZnO/3B_2O_3$-$3.5H_2O$) and FRC-600 from Mizusawa Industrial Chemicals, Ltd., and zinc stannate ($ZnSnO_3$) and zinc hydrostannate ($ZnSn(OH)_6$), obtainable by way of example with trade names Alcanex ZS and Alcanex ZHS from Mizusawa Industrial Chemicals, Ltd.

The compositions of the invention can moreover comprise by way of example antioxidants, metal deactivators, flame-retardant auxiliaries, fillers, and also lubricants.

Examples of suitable antioxidants are antioxidants of the amine group, such as 4,4'-dioctyl-diphenylamine, N,N'-diphenyl-p-phenylenediamine, 2,2,4-trimethyl-1,2-dihydroquinoline polymer; antioxidants of the phenol group, such as pentaerythrityl tetrakis(3-(3,5-di-tert-butyl-4-hydroxyphenyl)propionate), octadecyl 3-(3,5-di-tert-butyl-4-hydroxyphenyl)propionate, 1,3,5-trimethyl-2,4,6-tris(3,5-di-tert-butyl-4-hydroxybenzyl)benzene; antioxidants of the sulfur group, such as bis(2-methyl-4-(3-n-alkylthiopropionyloxy)-5-tert-butylphenyl)sulfite, 2-mercaptobenzoimidazole, and zinc salts thereof, and also pentaerythrityl tetrakis(3-dodecylthiopropionate).

Examples of suitable metal deactivators are N,N'-bis(3-(3,5-di-tert-butyl-4-hydroxyphenyl)propionyl)hydrazine, 3-(N-salicyloyl)amino-1,2,4-triazole, 2,2'-oxamidebis(ethyl-3-(3,5-di-tert-butyl-4-hydroxyphenyl)propionate).

Examples of flame-retardant auxiliaries, and also fillers, are carbon black, clay, zinc oxide, tin oxide, titanium oxide, magnesium oxide, molybdenum oxide, antimony(III) oxide, silicon compounds, quartz, talc, calcium carbonate, magnesium carbonate, and "white" carbon. In one preferred embodiment, the compositions of the invention comprise, in addition to components A to E, calcium carbonate as component F. Calcium carbonate that can be used in the compositions of the invention is by way of example fine-particle calcium carbonate, obtainable for example with trademark Mikrosöhl® from VK Damman KG.

Examples of suitable lubricants are lubricants of the hydrocarbon group, of the fatty acid group, of the fatty acid amide group, of the ester group, of the alcohol group, and also of the metal soaps group, preference being given here to lubricants of the ester group, of the alcohol group, and of the metal soaps group. Zinc stearate, stearic acid, and also magnesium stearate and fatty acid amides, are moreover suitable as lubricants.

The compositions of the invention can also comprise polysiloxanes as further additives, in particular polydimethylsiloxane. Suitable polydimethylsiloxanes are obtainable by way of example with trademark Genioplast®SP from Wacker. A polydimethylsiloxane PDMS masterbatch is involved here. In another preferred embodiment, the compositions of the invention comprise, in addition to components A to E, at least one polysiloxane, in particular polydimethylsiloxane, as component F. It is moreover preferable that the compositions of the invention comprise, alongside components A to E, both calcium carbonate and also at least one polysiloxane, in particular polydimethylsiloxane, as component F.

In one preferred embodiment, the present invention therefore provides a composition which comprises the following components:

a) at least one $C_2$-$C_4$-α-olefin-vinyl acetate copolymer having vinyl acetate content of ≤40% by weight or a mixture comprising at least one $C_2$-$C_4$-α-olefin-vinyl acetate copolymer having vinyl acetate content of ≤40% by weight and polyethylene, preferably an ethylene-vinyl acetate copolymer having vinyl acetate content of ≤40% by weight, preferably from 15 to ≤40% by weight, particularly preferably from 20 to 35% by weight, very particularly preferably from 20 to 30% by weight, or a mixture made of an ethylene-vinyl acetate copolymer having vinyl acetate content of ≤40% by weight, preferably from 15 to ≤40% by weight, particularly preferably from 20 to 35% by weight, very particularly preferably from 20 to 30% by weight, and LLDPE, as component A;

b) at least one ethylene-vinyl acetate copolymer having vinyl acetate content of from 45 to 98% by weight, preferably either (i) having vinyl acetate content of from 40 to 60% by weight, preferably from 40 to 50% by weight, or (ii) from 50 to 90% by weight, particularly from 70 to 85% by weight, as component B;

c) at least one ethylene-1-octene copolymer produced via metallocene catalysis, as component C;

d) maleic-anhydride-grafted LLDPE or maleic-anhydride-grafted ethylene-vinyl acetate copolymer preferably with vinyl acetate content of >40% by weight, as component D;

e) aluminum hydroxide (ATH), magnesium hydroxide (MDH), magnesium carbonate and/or sodium aluminum hydroxycarbonate and hydrotalcite, preferably aluminum hydroxide (ATH), magnesium hydroxide (MDH), and/or magnesium carbonate, particularly preferably aluminum hydroxide (ATH) and/or magnesium hydroxide (MDH), as component E; and f) optionally at least one auxiliary and/or additive selected from further flame retardants, antioxidants, metal deactivators, flame-retardant auxiliaries, fillers, lubricants, and polysiloxanes, preferably calcium carbonate and/or at least one polysiloxane, in particular polydimethylsiloxane, as component F.

The amount of component A present in the compositions of the invention is preferably from 10 to 30% by weight, particularly preferably from 15 to 25% by weight, very particularly preferably from 18 to 24% by weight, based on the total amount of components A to E and optionally F.

The amount of component B present in the compositions of the invention is preferably from 3 to 15% by weight, preferably from 5 to 13% by weight, particularly preferably from 7 to 12% by weight, based on the total amount of components A to E and optionally F.

The amount of component C present in the compositions of the invention is preferably from 1 to 10% by weight, preferably from 2 to 8% by weight, particularly preferably from 3 to 5% by weight, based on the total amount of components A to E and optionally F.

The amount of component D present in the compositions of the invention is preferably from 1 to 10% by weight, particularly preferably from 2 to 8% by weight, very particularly preferably from 3 to 5% by weight, based on the total amount of components A to E and optionally F.

The amount of component E present in the compositions of the invention is preferably from 40 to 75% by weight, particularly preferably from 40 to 70% by weight, very particularly preferably from 50 to 65% by weight, based on the total amount of components A to E and optionally F.

The amount of component F present in the compositions of the invention is preferably from 0 to 25% by weight, particularly preferably from 0.1 to 20% by weight, very particularly preferably from 0.5 to 15% by weight, based on the total amount of components A to F.

In one particularly preferred embodiment, the present invention therefore provides the abovementioned compositions of the invention comprising a) from 10 to 30% by weight, preferably from 15 to 25% by weight, particularly preferably from 18 to 24% by weight, of component A;

b) from 3 to 15% by weight, preferably from 5 to 13% by weight, particularly preferably from 7 to 12% by weight, of component B;

c) from 1 to 10% by weight, preferably from 2 to 8% by weight, particularly preferably from 3 to 5% by weight, of component C;

d) from 1 to 10% by weight, preferably from 2 to 8% by weight, particularly preferably from 3 to 5% by weight, of component D;

e) from 40 to 75% by weight, preferably from 45 to 70% by weight, particularly preferably from 50 to 65% by weight, of component E; and f) from 0 to 25% by weight, preferably from 0.1 to 20% by weight, particularly preferably from 0.5 to 15% by weight, of component F;

where the entirety of components A to E and optionally F is 100% by weight.

The compositions of the invention can be produced by processes known to the person skilled in the art via mixing of components A to E and optionally F. The mixture here can by way of example be produced via mixing of components A to E and optionally F at temperatures of from 25 to 180° C., preferably from 40 to 160° C. The mixing here can be carried out in any of the apparatuses that are suitable and known to the person skilled in the art, in particular in an extruder, preferably in a single-screw extruder. Examples of suitable single-screw extruders are single-screw extruders of the type represented by the Copperion system or Berstorf system.

The compositions of the invention are halogen-free flame-retardant (HFFR), polymeric materials which can be processed to give items in which fire protection is desired. The compositions of the invention are preferably used to produce insulation materials or, respectively, sheathing materials for cables and lines.

The present invention therefore also provides the use of the compositions of the invention as insulation materials or, respectively, sheathing materials for cables or lines, and also provides insulation materials or, respectively, sheathing materials for cables or lines comprising the compositions of the invention. Suitable lines are usually those composed of a conductor (wire) and of electrical insulation. The conductors can optionally also have an exterior layer as protective casing in addition to the electrical insulation. Suitable cables for the purposes of the present invention are a group of conductors encased with a sheathing material (encasing layer).

The composition of the invention can be used either as electrical insulation or as sheathing material (encasing layer) in the form of a second layer in a conductor or in the form of an encasing layer in a cable. It is equally possible to use the compositions of the invention in all of said layers. It is preferable to use the compositions of the invention as sheathing materials (encasing layer).

Suitable materials for conductors (wires) used in the cables or lines of the invention are generally copper or aluminum, or in specific instances superconductors, particular preference being given here to copper.

The person skilled in the art is aware of suitable materials which are used as insulation materials or as sheathing materials in the event that no composition of the invention is used.

The present invention further provides cables or lines which comprise a composition of the invention. The cables or lines can by way of example be produced via extrusion coating with the composition of the invention around a conductor (wire) or around a group of conductors.

The thickness of the layers formed from the compositions of the invention around a conductor (wire) or around a group of conductors is not generally subject to any restriction. Examples of preferred thicknesses are from 0.3 to 3 mm.

The examples below provide additional explanation of the invention.

EXAMPLES

1. Materials Used

EVA Escorene UL 00328 from Exxon Mobil Chemical (VA content: 27% by weight, melt flow index (MFI) 3 g/10 min, density: 0.951 g/cm$^3$)

EVM Levapren® 450 HV, 800 HV from Lanxess Deutschland GmbH (VA content: 45+/−1.5% by weight, melt flow index (MFI) (190° C./2.16 kg): 2.5 g/10 min, ML1+4/100° C.: 20+/−4 MU, density: 0.99 g/cm$^3$; and VA content: 80+/−1.5% by weight, melt flow index (MFI) (190° C./2.16 kg): 4/10 min, ML1+4/100° C.: 28+/−6 MU, density: 1.11 g/cm$^3$)

Maleic-acid-modified LLDPE: (MA_g_LLDPE) Fusabond® E MB-226DY from DuPont (melt flow index (MFI) (190° C./2.16 kg): 1.5 g/10 min, density: 0.93 g/cm$^3$)

Fine precipitated ATH: Apyral® 40CD from Nabaltec (BET surface area: 3.5 m2/g, D50:1.3 μm, density: 2.4 g/cm$^3$)

Maleic-acid-modified EVM (MA_g_EVM): Levamelt® MA 450 VP from Lanxess Deutschland GmbH (VA content: 45+/−1.5% by weight, melt flow index (MFI) (190° C./2.16 kg): 0.8 g/10 min, density: 1.05 g/cm$^3$)

Stabilizer: Irganox® from Ciba

Polydimethylsiloxane: Genioplast® S P PDMS masterbatch from Wacker

Fine calcium carbonate (CaCO$_3$): Mikrosöhl® Calcium Carbonate from VK Damman KG (density: 2.7 g/cm$^3$)

EOC: Ethylene-Octene Plastomer Exact® 0210 from DSM/Exxon Mobil Chemical Joint Venture (melt flow index (MFI): 10 g/10 min, density: 0.902 g/cm$^3$)

2. Compositions

The compositions mentioned in tables 1 and 2 are produced and their properties are studied.

TABLE 1

EVA formulations based on compositions using various EVM rubbers and MA_g_LLDPE

| Components | CA | C1 | C2 | C4 |
|---|---|---|---|---|
| EVM (VA = 45% by weight) | | 9.37 | | |
| EVM (VA = 80% by weight) | | | 9.37 | 8.42 |
| EVA (VA = 27% by weight) | 29.96 | 20.59 | 20.59 | 18.53 |
| EOC | 3.75 | 3.75 | 3.75 | 3.37 |
| MA-g-LLDPE | 3.75 | 3.75 | 3.75 | 3.75 |
| ATH (BET 3.5 m$^2$/g) | 61.80 | 61.80 | 61.80 | 55.55 |
| PDMS masterbatch | 0.37 | 0.37 | 0.37 | 0.33 |
| Stabilizer | 0.37 | 0.37 | 0.37 | 0.33 |
| Calcium carbonate (CaCO$_3$) | | | | 10.10 |
| Total [% by weight] | 100.00 | 100.00 | 100.00 | 100.00 |
| Density [g/cm$^3$] | 1.513 | 1.522 | 1.546 | 1.616 |

Composition CA is a comparative example which comprises no component B. Compositions C1, C2, and C4 are inventive.

TABLE 2

EVA formulations based on compositions using various EVM rubbers and MA_g_EVM

| Components | C5 |
|---|---|
| EVM (VA = 45% by weight) | 9.37 |
| EVA (VA = 27% by weight) | 20.59 |
| EOC | 3.75 |
| MA-g-EVM (VA = 45% by weight) | 3.75 |
| ATH (BET 3.5 m$^2$/g) | 61.80 |
| PDMS masterbatch | 0.37 |
| Stabilizer | 0.37 |
| Calcium carbonate (CaCO$_3$) | |
| Total [% by weight] | 100.00 |
| Density [g/cm$^3$] | 1.522 |

Composition 5 is inventive.

3. Production of the Compositions

The individual components are compounded in an internal mixer (GK 1.5E from Werner & Pfleiderer). The table below gives the compounding conditions.

TABLE 3

| Temperature | 60° C. |
|---|---|
| Rotor speed | 50 rpm |
| Addition of polymer(s) | 30 s |
| Addition of fillers and additives | 90 s |
| Purge | 60 s |
| Mix | 60 s |
| Total | 240 s |

The compositions are granulated and then dried at 80° C. for 3 hours prior to processing in the extruder. The compositions are extruded in a Brabender single-screw extruder (25 L/D) after drying. The extrusion parameters are given below.

Screw compression: 2:1
Die: 20*2*100 mm
Temperature: 130-140-145-150° C.

TABLE 4

| Screw speed | 85 rpm | C1 | C2 | C4 | C5 |
|---|---|---|---|---|---|
| Torque | Nm | 30.9 | 33.2 | 36.2 | 27.1 |
| Melt temperature T4 | ° C. | 160 | 160 | 161 | 160 |
| Pressure D1 | bar | 239 | 265 | 285 | 234 |
| Pressure D2 | bar | 87 | 97 | 104 | 88 |
| Pressure D3 | bar | 43 | 48 | 53 | 44 |
| Output | g/min | 59 | 61.8 | 66.6 | 49.4 |
| Melt viscosity | Pas | 604 | 629 | 614 | 710 |

4. Test Methods

The compositions mentioned in tables 1 and 2 are tested by the following ASTM methods (or DIN methods):

ASTM E 1354: Cone calorimeter, 50 kW/m2
ASTM E 662: NBO Smoke chamber (flaming and non-flaming as described)
ASTM D2863: Limitin Oxygen Index (LOI)
ASTM D 412 or DIN 53504 Tensile test (dumbell)
ASTM D 2240 Shore A and D hardness
ASTM D 471 Hot-air aging
ASTM D 573 Swelling in IRM oil 902
DIN EN ISO 1133 Melt flow index (MFI)
ASTM D 1646 Mooney viscosity

Figure 2:
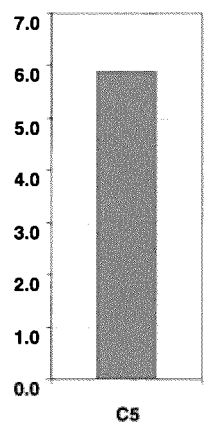
Figure 3:
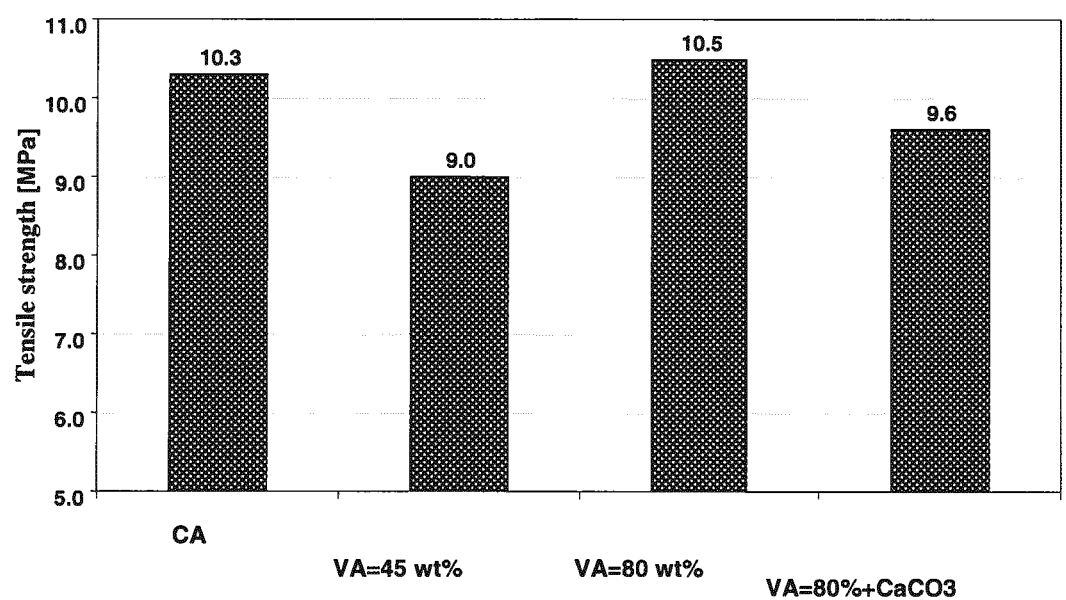
Figure 4:
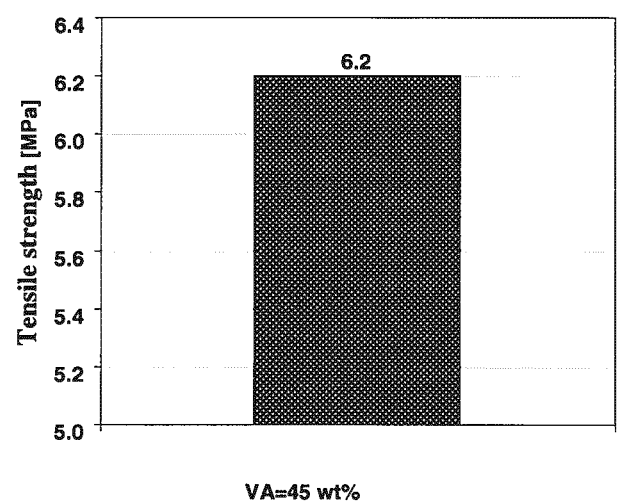
Figure 5:
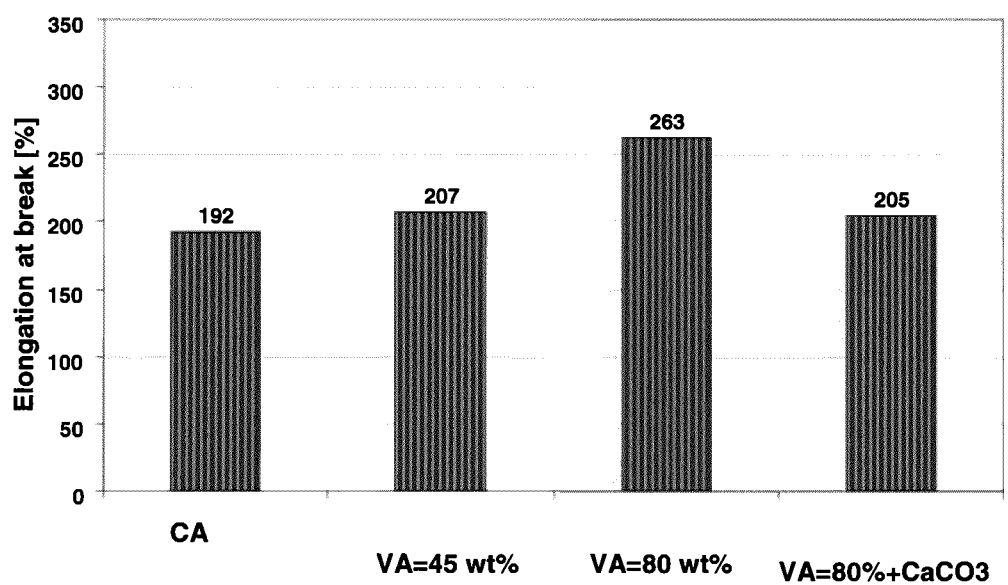
Figure 6:
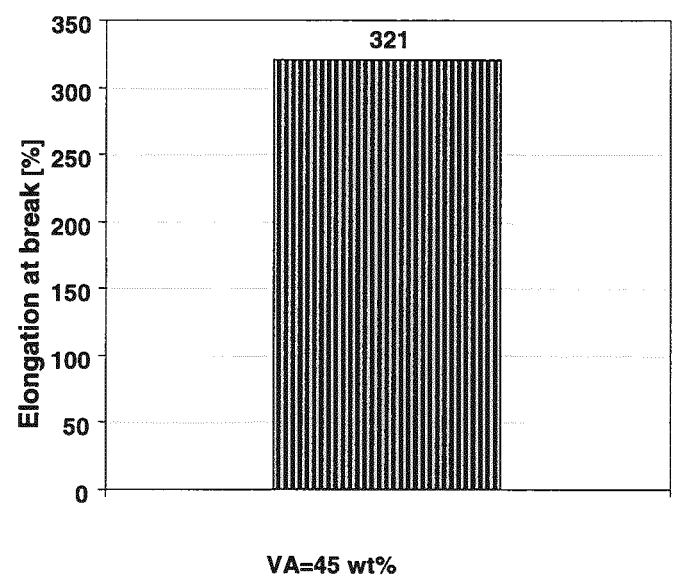
Figure 7:
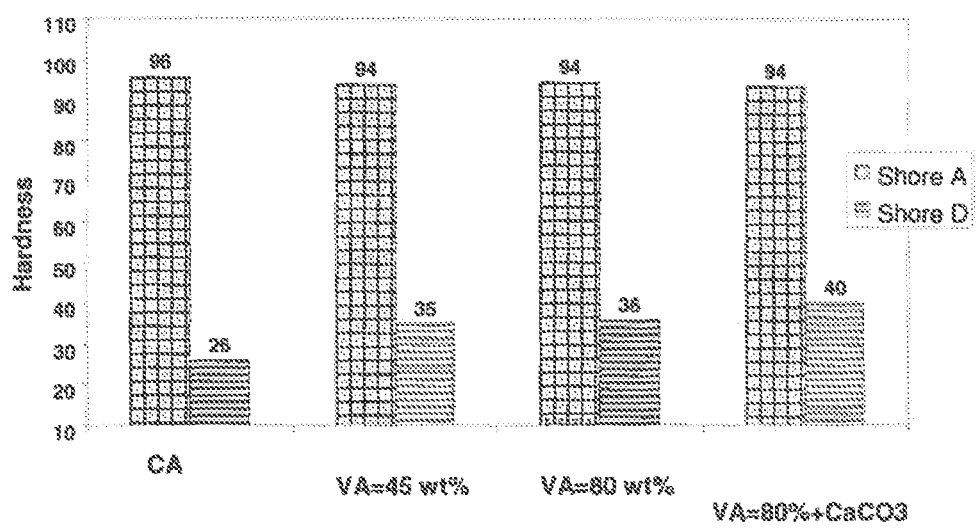
Figure 8:
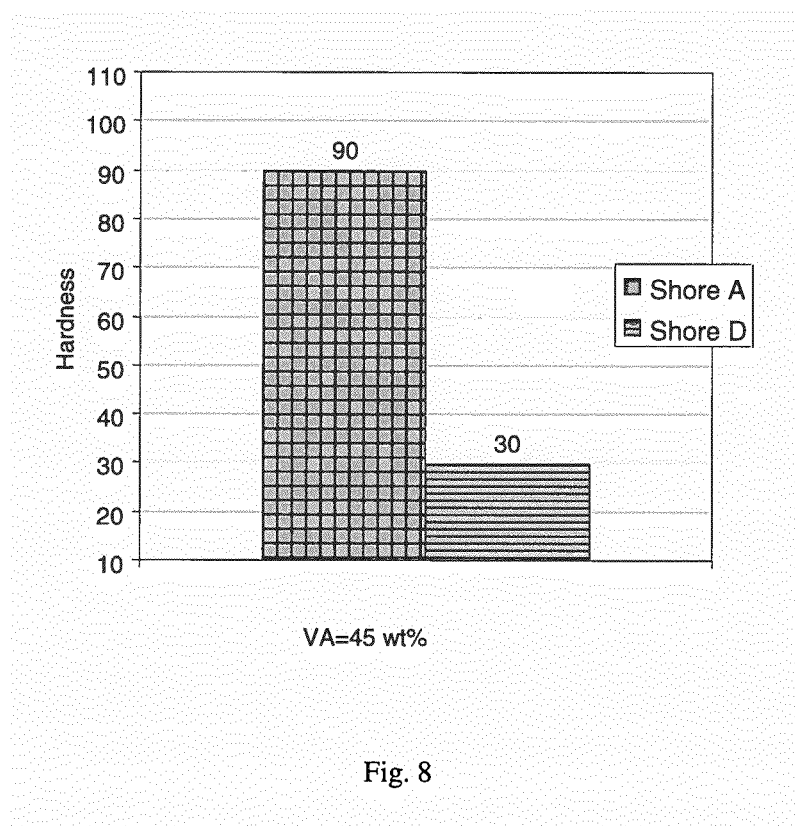
Figure 9:
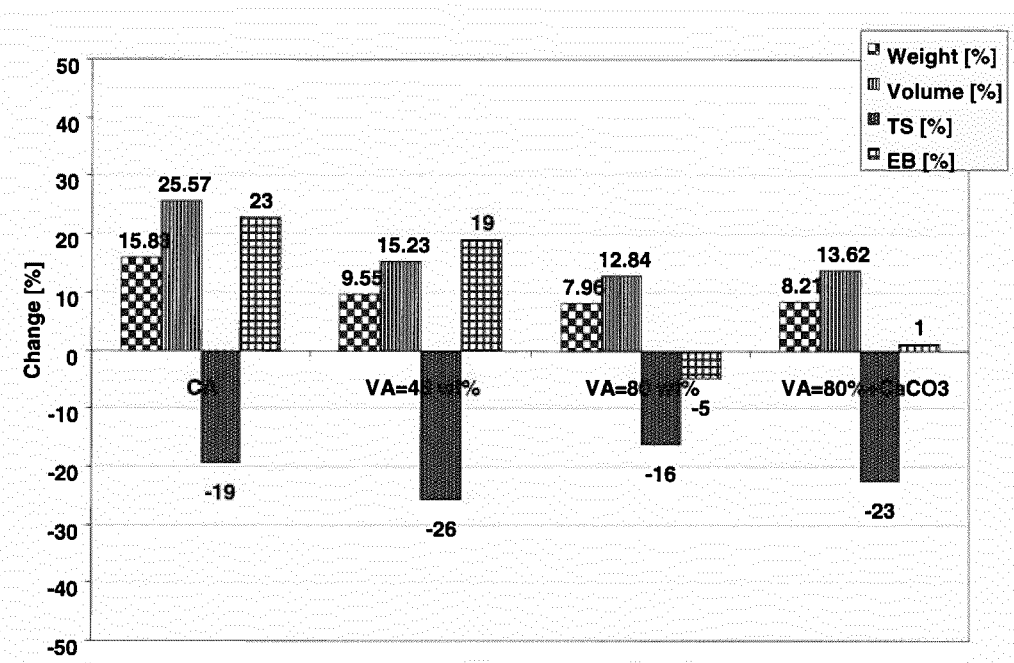

5. Results 5.1 Melt flow index (MFI) of compositions produced using MA_g_LLDPE (FIG. 1)
CA: Comparison
5.2 Melt flow index (MFI) of the composition produced using MA_g_EVM (FIG. 2)
5.3 Tensile strength of compositions produced using MA_g_LLDPE (FIG. 3)
CA: Comparison
5.4 Tensile strength of the composition produced using MA_g_EVM (FIG. 4)
5.5 Elongation at break of compositions produced using MA_g_LLDPE (FIG. 5)
CA: Comparison 5.6 Elongation at break of the composition produced using MA_g_EVM (FIG. 6)
5.7 Hardness of compositions produced using MA_g_LLDPE (FIG. 7)
CA: Comparison
5.8 Hardness of the composition produced using MA_g_EVM (FIG. 8)
5.9 Behavior of compositions produced using MA_g_LLDPE (FIG. 9) on immersion in N° 902 oil at 70° C. for 4 hours
CA: Comparison
Key:

| | |
|---|---|
| Weight [%] | Change in weight in % |
| Volume [%] | Change in volume in % |
| TS [%] | Change in tensile strength in % |
| EB [%] | Change in elongation at break in % |

Figure 10:
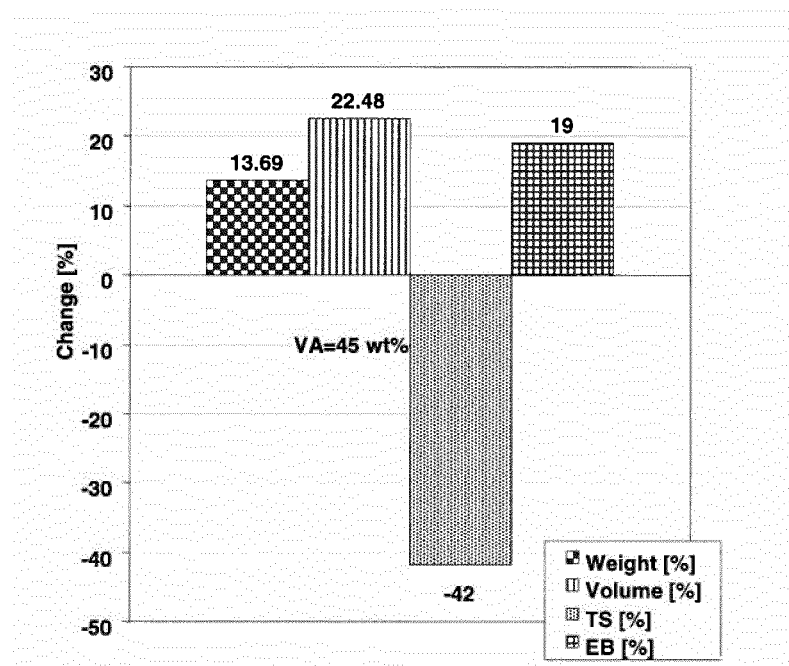

5.10 Behavior of the composition produced using MA_g_EVM (FIG. 10) on immersion in N° 902 oil at 70° C. for 4 hours
Key:

| | |
|---|---|
| Weight [%] | Change in weight in % |
| Volume [%] | Change in volume in % |
| TS [%] | Change in tensile strength in % |
| EB [%] | Change in elongation at break in % |

Figure 11:
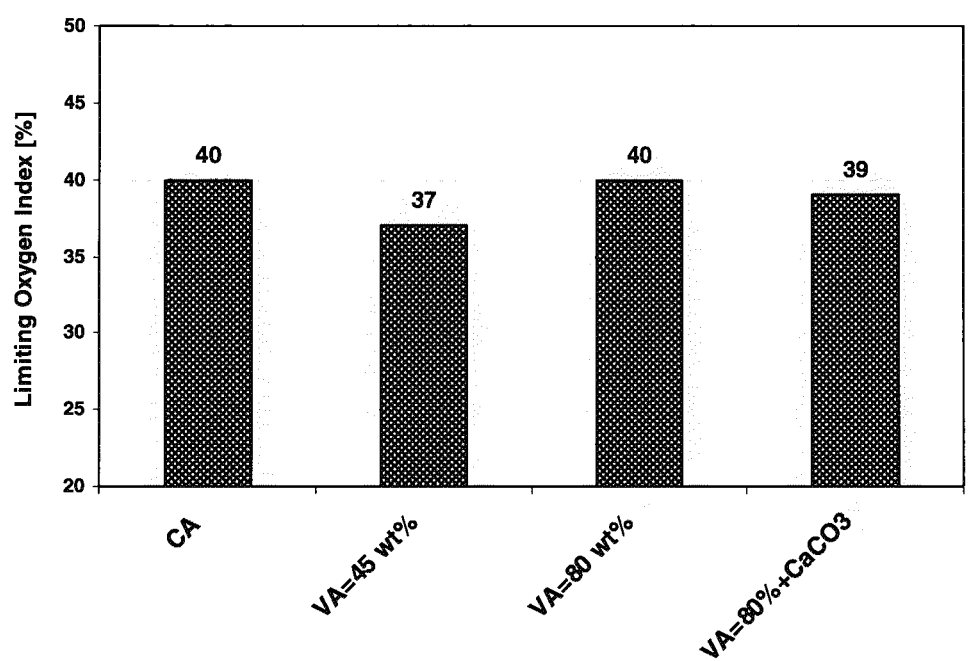
Figure 12:
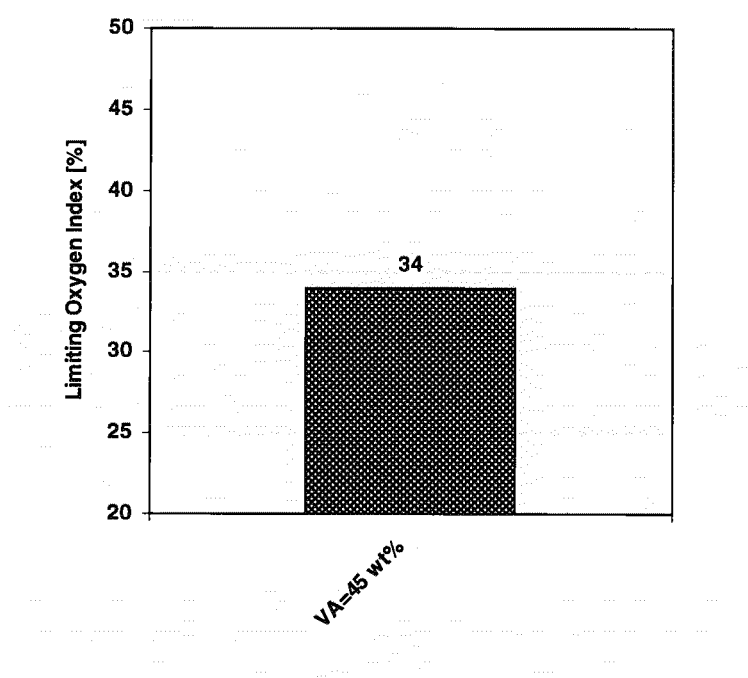
Figure 13:
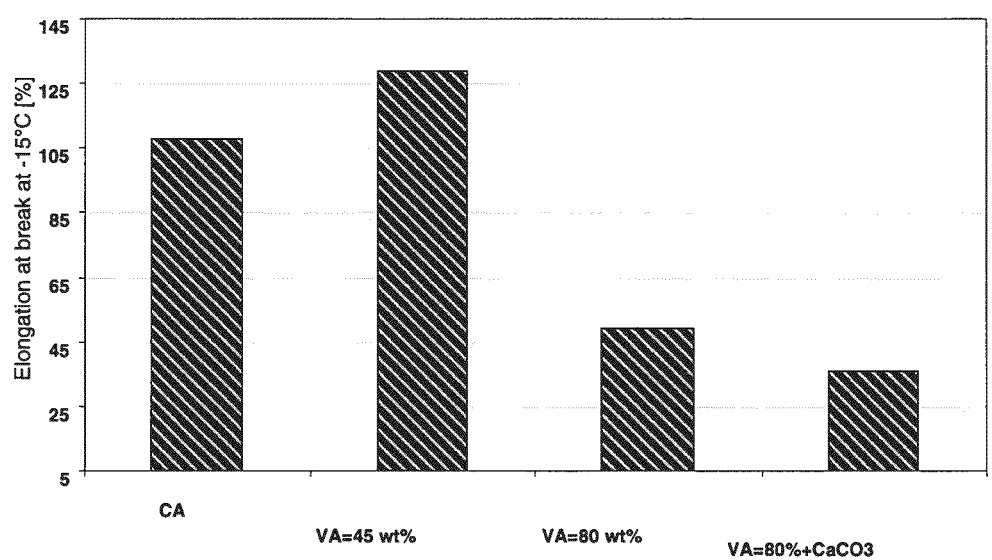
Figure 14:
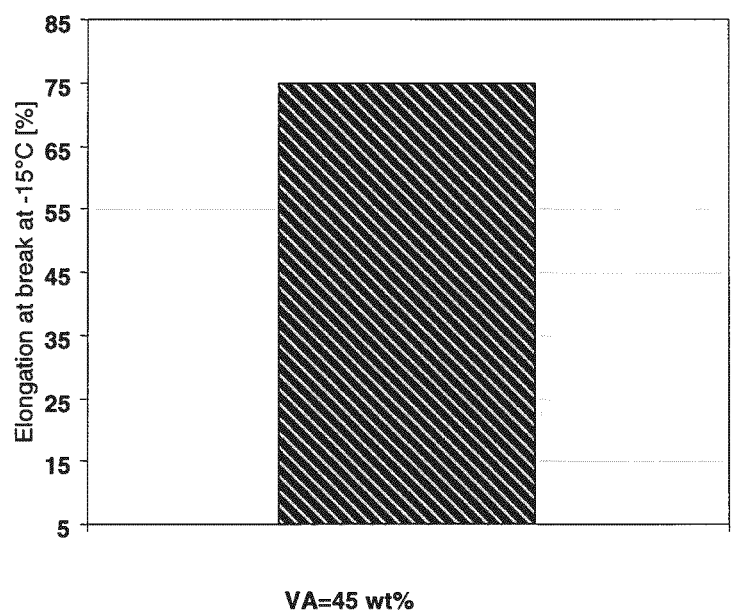

5.11 Oxygen index (limiting oxygen index, LOI) of compositions produced using MA_g_LLDPE (FIG. 11)
CA: Comparison
5.12 Oxygen index (limiting oxygen index, LOI) of the composition produced using MA_g_EVM (FIG. 12)
5.13 Elongation at break at −15° C. of compositions produced using MA_g_LLDPE (FIG. 13)
CA: Comparison
5.14 Elongation at break at −15° C. of the composition produced using MA_g_EVM (FIG. 14)

Figure 15:
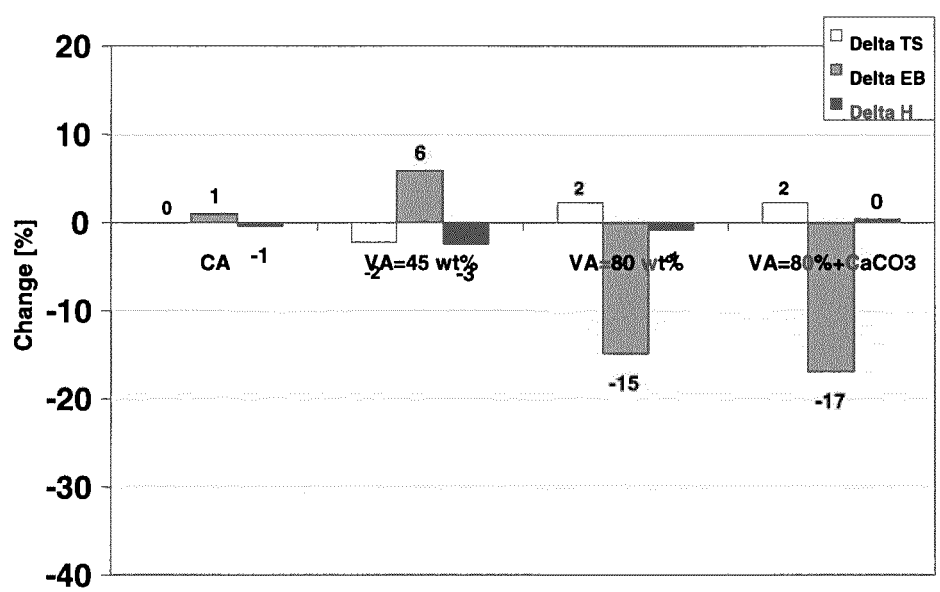
Figure 16:
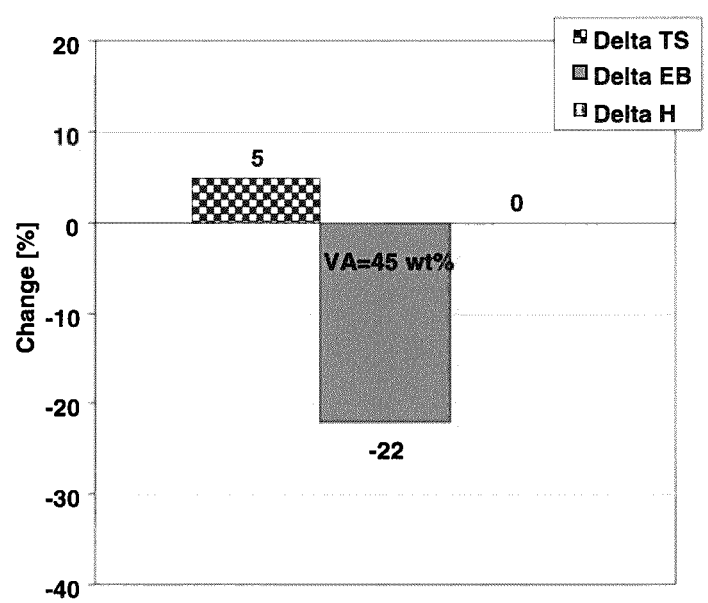

5.15 Hot-air aging, for 10 days at 100° C., of compositions produced using MA_g_LLDPE (FIG. 15)
CA: Comparison
Key:
Delta TS: Change in tensile strength in %
Delta EB: Change in elongation at break in %
Delta H: Enthalpy change in %
5.16 Hot-air aging, for 10 days at 100° C., of the composition produced using MA EVM (FIG. 16)
Key:
Delta TS: Change in tensile strength in %
Delta EB: Change in elongation at break in %
Delta H: Enthalpy change in %
5.17 Fire tests (cone calorimeter)

TABLE 5

| Composition | t(ig) [s] | HRR (peak) [kW/m²] | THR [MJ/m²] | HRR (180) [kW/m²] | HRR (300) [kW/m²] | MLR [g/s * m²] | EHC [MJ/kg] | SPR [m²/s] | SEA [m²/kg] |
|---|---|---|---|---|---|---|---|---|---|
| C1 | 52 | 214.16 | 29.07 | 128.35 | 90.44 | 6.4 | 26.07 | 0.0060 | 236.93 |
| C2 | 46.3 | 215.38 | 23.42 | 107.97 | 73.64 | 4.6 | 21.62 | 0.0068 | 309.98 |
| C4 | 48.7 | 194.94 | 22.80 | 102.41 | 67.31 | 5.5 | 21.97 | 0.0048 | 211.78 |
| C5 | 50 | 269.71 | 23.23 | 108.24 | 72.39 | 5.4 | 21.65 | 0.0015 | 198.45 |

Table 5 collates the cone calorimeter data. The data encompass:

| | |
|---|---|
| t(ig) in [s] | Time to ignition (TTI) |
| HRR (peak) in [kW/m²] | Maximum heat release rate (peak heat release rate, PHRR) |
| THR in [MJ/m²] | Total heat release rate (THR) |
| HRR (180) in [kW/m²] | Average heat release rate after 180 s |
| HRR (300) in [kW/m²] | Average heat release rate after 300 s |
| MLR in [g/s * m²] | Mass loss rate (MLR) |
| EHC in [MJ/kg] | Enthalpy of combustion (EHC) |
| SPR in [m²/s] | Smoke production rate (SPR) |
| SEA in [m²/kg] | Smoke density (SEA) |

Figure 17:
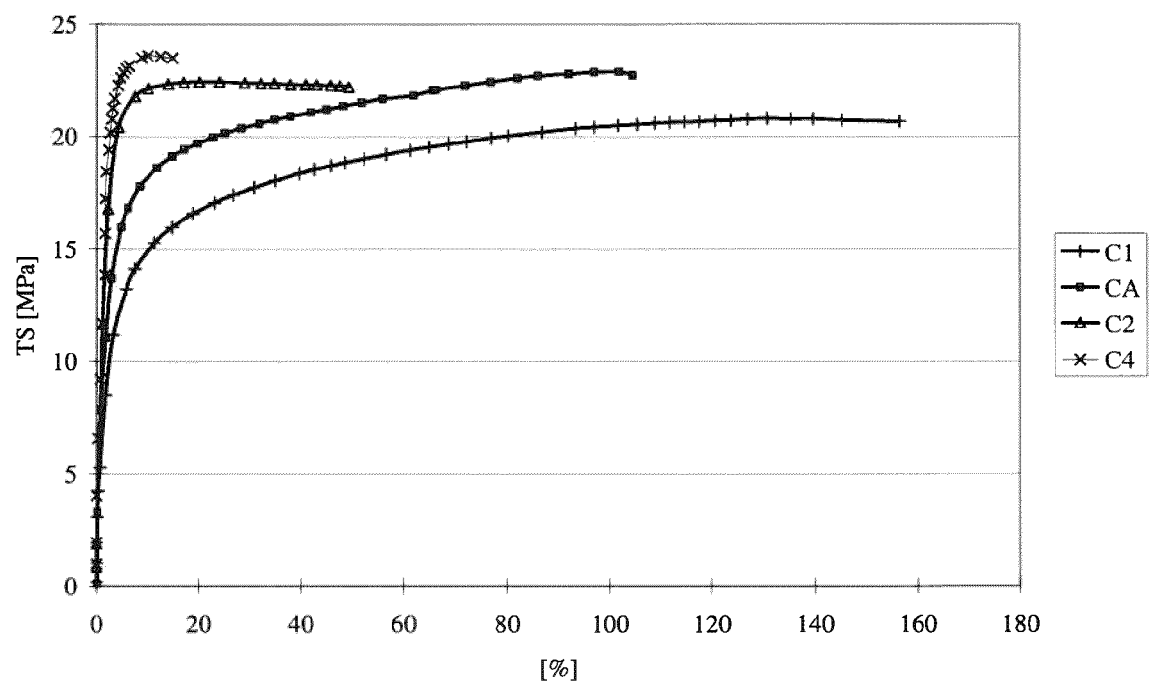

5.18 Cold bending test at −15° C.
Mixtures C1, C2, C4 and C5: passed
5.19 Tensile strength at −15° C. of compositions produced using MA_g_LLDPE
FIG. 17 attached shows tensile strength curves at −15° C. for the compositions CA, C1, C2 and C4.
Key to FIG. 17:

| | |
|---|---|
| x-axis | Elongation in % |
| y-axis | Tension (stress) in MPa |
| Gray cross | Tensile strength curve at −15° C. for mixture C1 |
| Black squares | Tensile strength curve at −15° C. for mixture CA (comparison) |
| Gray triangles | Tensile strength curve at −15° C. for mixture C2 |
| Black x | Tensile strength curve at −15° C. for mixture C4 |

Figure 18:
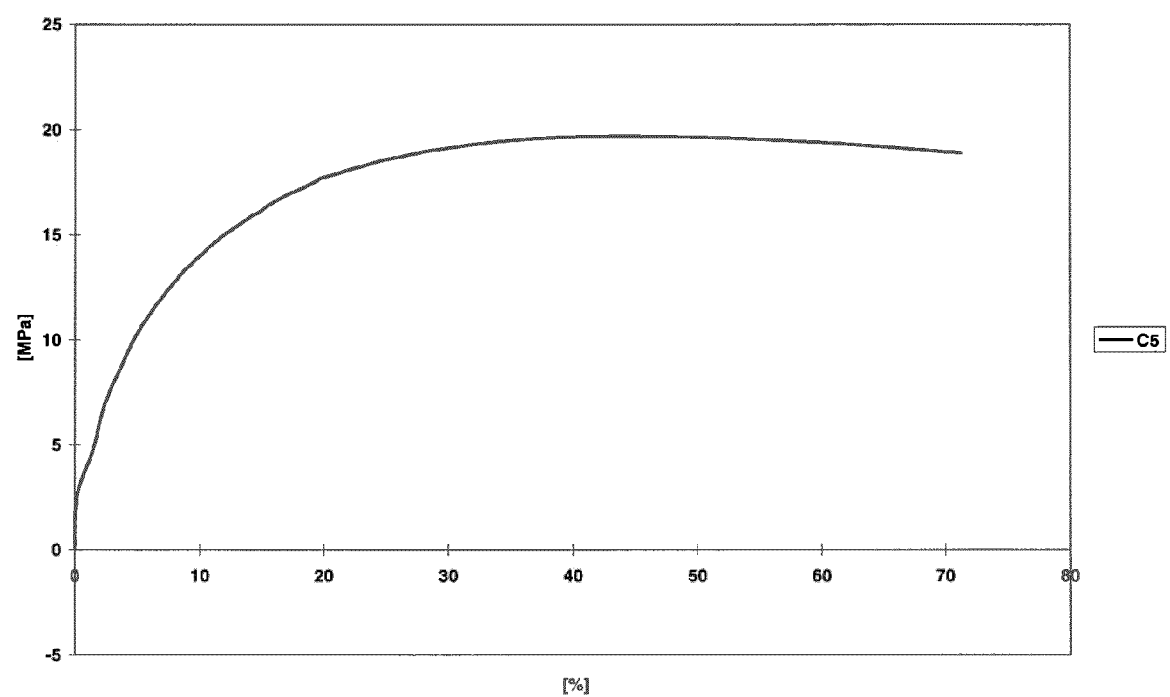

5.20 Tensile strength at −15° C. for the composition produced using MA_g_EVM
FIG. 18 attached shows the tensile strength curve at −15° C. for composition C5.
Key to FIG. 18:

| | |
|---|---|
| x-axis | Elongation in % |
| y-axis | Tension (stress) in MPa |
| Black squares | Tensile strength curve at −15° C. for mixture C5 |

What is claimed is:

1. A composition comprising
a) as component A, a first copolymer component having a first vinyl acetate content, the first copolymer component comprising;
   at least one first $C_2$-$C_4$-$\alpha$-olefin-vinyl acetate copolymer having a vinyl acetate content of ≤40% by weight, or a mixture comprising polyethylene and at least one first $C_2$-$C_4$-$\alpha$-olefin-vinyl acetate copolymer having a vinyl acetate content of ≤40% by weight;
b) at least one second $C_2$-$C_4$-$\alpha$-olefin-vinyl acetate copolymer having a vinyl acetate content of greater than 40% by weight, as component B;
c) at least one plastomer produced via metallocene catalysis and based on ethylene and on at least one $C_4$-$C_8$-olefin as component C, where component C differs from component A;
d) at least one polyolefin homo- or copolymer, modified with an unsaturated carboxylic acid or with a derivative thereof, as component D;
e) at least east one flame retardant as component E; and
f) optionally one or more further auxiliaries and/or further additives as component F.

2. The composition as claimed in claim 1, wherein:
a) component A comprises a mixture comprising a first ethylene-vinyl acetate copolymer having a vinyl acetate content of ≤40% by weight and LLDPE;
b) component B comprises at least one second ethylene-vinyl acetate copolymer having a vinyl acetate content of from 45 to 98% by weight;
c) component C comprises at least one ethylene-1-octene copolymer produced via metallocene catalysis;
d) component D comprises maleic-anhydride-grafted LLDPE or maleic-anhydride-grafted ethylene-vinyl acetate copolymer;
e) component E comprises one or more of aluminum hydroxide, magnesium hydroxide, magnesium carbonate, sodium aluminum hydroxycarbonate, and hydrotalcite; and
f) optionally component F comprises at least one auxiliary and/or additive selected from further flame retardants, antioxidants, metal deactivators, flame-retardant auxiliaries, fillers, lubricants, polysiloxanes, calcium carbonate, polysiloxane, and polydimethylsiloxane.

3. The composition according to claim 1, wherein
a) component A is present in an amount of from 10 to 30% by weight;
b) component B is present in an amount of from 3 to 15% by weight;
c) component C is present in an amount of from 1 to 10% by weight;
d) component D is present in an amount of from 1 to 10% by weight;
e) component E is present in an amount of from 40 to 75% by weight; and
f) component F is optionally present in an amount of from 0 to 25% by weight;
where the entirety of components A to E and optionally F is 100% by weight.

4. A process for producing the composition as claimed in claim 1, comprising: mixing together components A through E and optionally F.

5. A process for the insulation and sheathing of a cable and a line, respectively, comprising: insulating the cable and sheathing the line with the composition according to claim 1.

6. An insulation material or sheathing material for cables or lines, respectively, comprising the composition according to claim 1.

7. A cable or line comprising the composition according to claim 1.

* * * * *